(No Model.)

O. TABER.
CHECKREIN HOOK.

No. 424,624.　　　　　　　　　Patented Apr. 1, 1890.

Witnesses.
Fred S. Greenleaf
Maurick L. Emery

Inventor.
Orrin Taber.
by Crosby & Gregory
Attys.

United States Patent Office.

ORRIN TABER, OF EAST SOMERVILLE, MASSACHUSETTS, ASSIGNOR, BY DIRECT AND MESNE ASSIGNMENTS, TO THE NASHUA SADDLERY HARDWARE COMPANY, OF NASHUA, NEW HAMPSHIRE.

CHECKREIN-HOOK.

SPECIFICATION forming part of Letters Patent No. 424,624, dated April 1, 1890.

Application filed February 26, 1889. Serial No. 301,238. (No model.)

*To all whom it may concern:*

Be it known that I, ORRIN TABER, of East Somerville, county of Middlesex, State of Massachusetts, have invented an Improvement in Checkrein-Hooks, of which the following description, in connection with the accompanying drawings, is a specification, like letters on the drawings representing like parts.

This invention has for its object to improve the construction of checkrein-hooks, whereby the loop of the checkrein, having but a small circular hole through it, may be slipped onto the hook and held in place, and thereafter may be removed with facility.

In accordance with this invention the hook, bent as usual and commonly termed a "wire hook," being circular in cross-section, is formed at one end with a flattened portion having a hole through it to receive the bolt, screw, or other fastening by which it may be attached to a saddle-tree. A slender gravitating lever is connected to the opposite end of said hook by a pivot-pin passing through it and through side or cheek pieces at the end of the hook, and between which the lever is hung at a point between its ends, so that one part or arm of said lever shall serve to normally close the passage between the end of the hook and the seat by gravity, while the other part or arm of said lever shall project beyond the end of the said hook and shall serve as a means by which to move the lever into position to open the said passage, that the checkrein may be removed.

The under or inner side of the hook at the end is grooved to receive one arm or part of the said pivoted lever when raised, so that no obstruction or enlargement is formed or presented at the end of the hook which would prevent the removal of the checkrein with facility.

Figure 1:
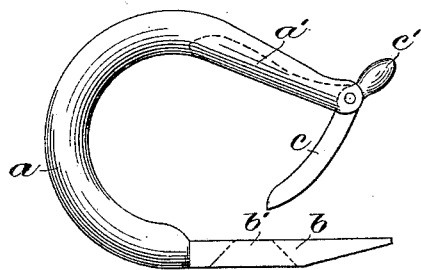
Figure 2:
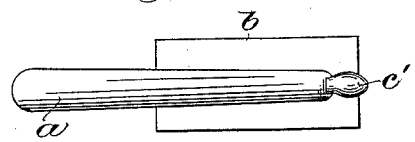

Figure 1 shows, in side elevation, a checkrein or water hook embodying this invention; Fig. 2, a top view of the hook shown in Fig. 1; and Fig. 3, a hook of well-known form, having my invention applied thereto.

The hook $a$, bent as usual and commonly termed a "wire hook," being circular in cross-section, has a flattened portion $b$, provided with a hole $b'$ (see dotted lines) to receive a bolt, screw, or other suitable fastening by which the hook may be secured to the saddle-tree. A lever is pivoted at a point between its ends to the opposite end of the said hook, which is recessed, as shown, to leave side or cheek pieces, between which the lever is hung, the pivot-pin passing through the pieces and the lever, one part or arm $c$ of said lever serving to normally close the passage between the end of the hook and the seat of the saddle by gravity, while the other part or arm $c'$ projects beyond the end of the hook and serves as means by which the part or arm $c$ is raised. The part or portion $c'$ is made oval and tapering toward its end.

In putting the checkrein on the hook it is very difficult to get an equalized strain on the fingers to avoid lateral strain on the pivoted lever, such lateral strain often breaking the lever off of the hook at its pivot.

By the use of the side or cheek pieces lateral strain or movement of the lever is impossible, the said pieces taking up and distributing such strain without subjecting the lever and its pivot thereto.

The under or inner side of the hook is grooved for a short distance at its end, as at $a'$, to receive the part or arm $c$ when in its most elevated position, so that no obstruction or enlargement is formed or presented to prevent ready removal of the checkrein, the loop of which has but a small hole through it.

I am aware that it is not new to provide a flat checkrein-hook with a pivoted lever, and, furthermore, a spring was employed for the pivoted lever, moving it over a cam-shaped end, and instead of a groove being provided for the lever the under side of the hook was cut away, so that the square corners of the lever were exposed, upon which the checkrein could catch.

Figure 3:
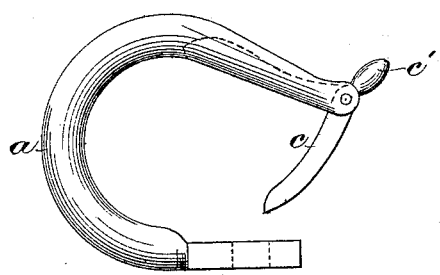

In Fig. 3 the flattened end portion $b$ is made shorter than in Fig. 1 to fit other forms of saddle-tree.

I claim—

The checkrein-hook herein described, consisting of the hook $a$, the end of which is grooved, as at $a'$, and provided with side or cheek pieces, and the pivoted gravitating lever held between said side or cheek pieces, consisting of the part or arm $c$, of suitable shape to enter the said groove $a'$, and the handle $c$, the cheek-pieces preventing lateral displacement of the lever, substantially as and for the purposes set forth.

In testimony whereof I have signed my name to this specification in the presence of two subscribing witnesses.

ORRIN TABER.

Witnesses:
BERNICE J. NOYES,
B. DEWAR.